(12) United States Patent
Bausenwein et al.

(10) Patent No.: US 7,403,320 B2
(45) Date of Patent: Jul. 22, 2008

(54) 2-CHANNEL DISPLAY SYSTEM COMPRISING MICRO ELECTRO MECHANICAL SYSTEMS

(76) Inventors: Bernhard Rudolf Bausenwein, Eichenstrasse 32, Hagelstadt (DE) 93095; Max Mayer, Hutstrasse 39, Forchheim (DE) 91301

( * ) Notice: Subject to any disclaimer, the term of this patent is extended or adjusted under 35 U.S.C. 154(b) by 153 days.

(21) Appl. No.: 11/017,916

(22) Filed: Dec. 22, 2004

(65) Prior Publication Data
US 2005/0141076 A1 Jun. 30, 2005

(30) Foreign Application Priority Data
Dec. 29, 2003 (DE) .................... 103 61 915

(51) Int. Cl.
- G02B 26/00 (2006.01)
- G02B 26/08 (2006.01)
- G02B 27/10 (2006.01)
- G02B 27/12 (2006.01)
- G02F 1/29 (2006.01)

(52) U.S. Cl. .................. 359/290; 359/291; 359/292; 359/298; 359/618; 359/640

(58) Field of Classification Search .......... 359/290, 359/291, 292, 298, 283, 242, 251, 267, 618, 359/629, 639, 640
See application file for complete search history.

(56) References Cited

U.S. PATENT DOCUMENTS

| | | | |
|---|---|---|---|
| 4,647,966 A | 3/1987 | Phillips et al. | |
| 5,600,383 A | 2/1997 | Hornbeck | |
| 5,638,142 A | 6/1997 | Kavanagh et al. | |
| 5,921,650 A | 7/1999 | Doany et al. | |
| 5,982,541 A | 11/1999 | Li et al. | |
| 6,250,763 B1 | 6/2001 | Fielding et al. | |
| 6,547,396 B1 | 4/2003 | Svardal et al. | |
| 6,631,993 B2 | 10/2003 | Fielding | |

FOREIGN PATENT DOCUMENTS

| | | |
|---|---|---|
| DE | 4040081 | 4/1994 |
| WO | WO 01/37029 | 5/2001 |
| WO | WO 02/32149 | 4/2002 |
| WO | WO 02/076107 | 9/2002 |
| WO | WO 03/065737 | 8/2003 |

OTHER PUBLICATIONS

Larry J Hornbeck, From cathode rays to digital micromirrors . . . , Texas Instruments Tech.Journal, Jul.-Sep. 1998 pp. 7-46.
Barco Galaxy Warp, Ref. No. R599655 (from: www.vr.barco.com).

*Primary Examiner*—Ricky L Mack
*Assistant Examiner*—Brandi N Thomas

(57) ABSTRACT

The two channel stereo display system with micro electromechanical systems (MEMS, e.g. DMDs from Texas Instruments) simultaneously generates a right and a left image in two discrete modulation channels, which differ by the polarization of their light beams. More specifically, the invention relates to the chirality (handedness) of MEMS and uncovers solutions for some of the geometric problems associated with this handedness in stereoscopic systems. Unpolarized light is split by a first PBS (5) and directed via two TIRs (3,4) onto two MEMSs (1,2) for spatial modulation. In some embodiments, mirror symmetric, compact light paths and complete superposition of the two subimages with a second PBS (6) are realized with two different MEMSs (1) and (2) which are a pair of stereo isomers. Furthermore we uncover solutions with two identical MEMSs.

13 Claims, 12 Drawing Sheets

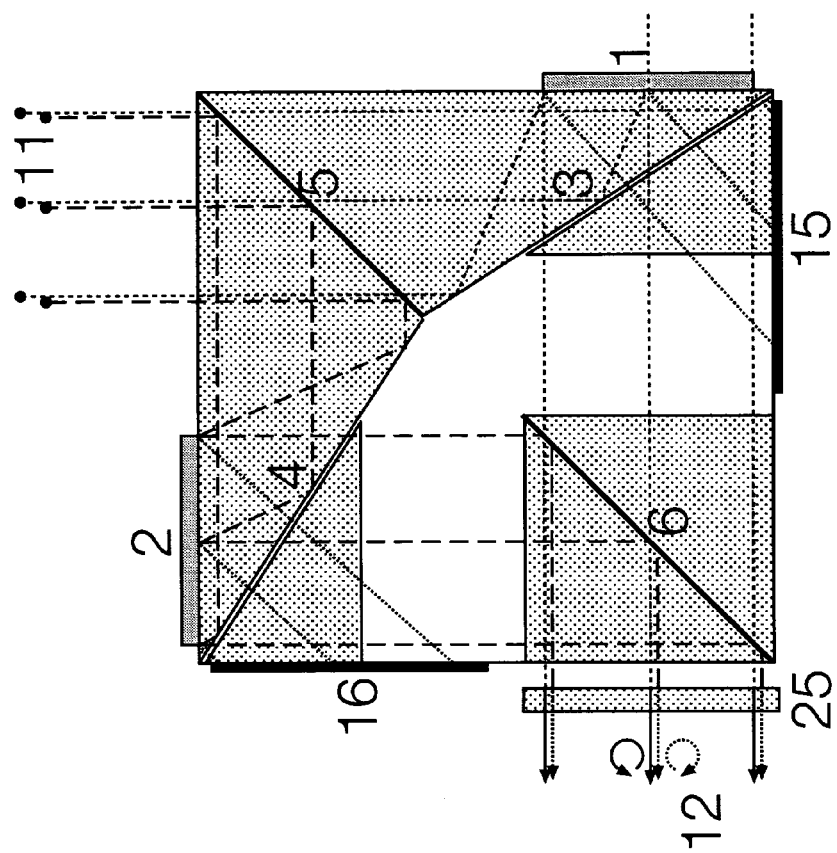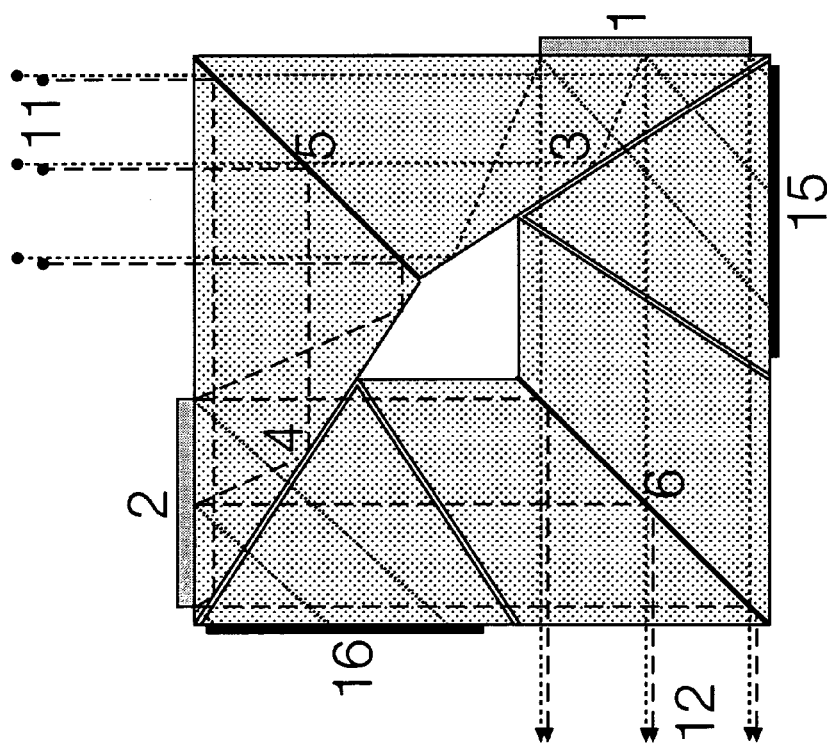

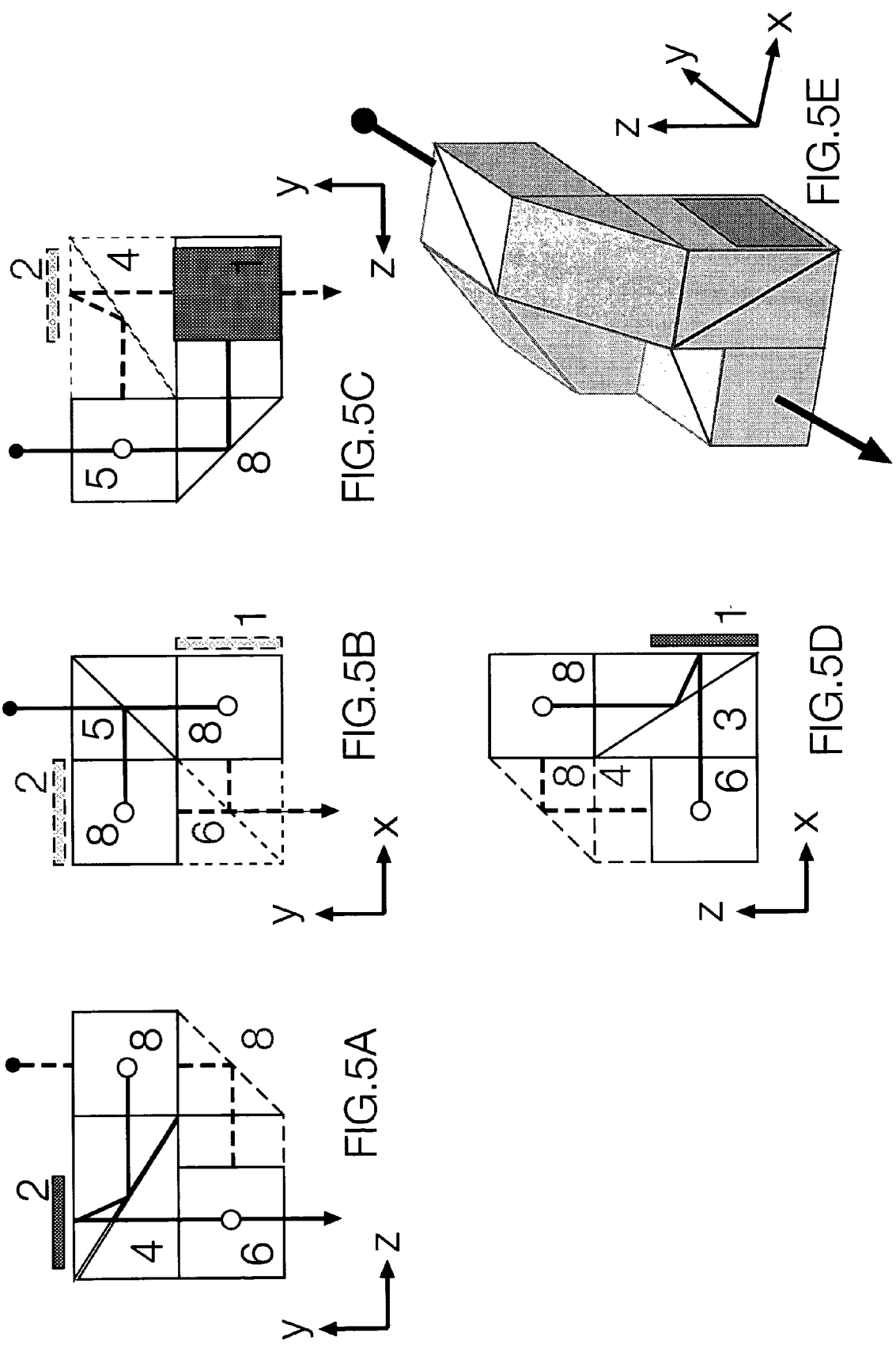

2-CHANNEL DISPLAY SYSTEM COMPRISING MICRO ELECTRO MECHANICAL SYSTEMS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention uncovers a two channel stereo display, which simultaneously generates a right and left image in discrete modulation channels, which differ by the polarization of their light beams. The invention relates to display and projection systems using micro electro mechanical systems (MEMS) as displays. More specifically, the invention relates to the chirality (handedness) of deflectable micro mirror devices (DMD) and uncovers solutions for some of the geometric problems associated with this handedness in stereoscopic systems.

The human vision does not perceive the polarization of light, nor can it discriminate states of polarization. Polarization does not influence the brightness nor the colors of an image. Therefore, in so called passive stereo display systems in the state of the art, polarization is used for coding left and right eye information in a combined beam. Goggles with "passive" polarizing sheets, decode (separate) these signals so that only light of one plane of polarization reaches the right eye, while light of the other plane of polarization reaches the left eye.

Image generation in digital display systems is achieved with spatial light modulators (SLM). These SLMs comprise a rectangular matrix of N×M electronically addressable discrete pixels. SLMs modulate the constantly bright incident light according to the control signal by removing light from the incident beam to generate darker parts of the image. The type of modulation classifies two groups of modulators: Liquid Crystal—SLMs, (LCD) and micro electro mechanical Systems (MEMS, e.g. DMD).

Liquid Crystal SLMs work either reflectively (e.g. LCoS) or transmissively (LCD). In either case, the modulators require prepolarized light of a certain linear polarization (e.g. "S"-polarized light). Each pixel is "marked" by rotating the plane of polarization (in the example given, the on-modulated beam is turned from "S" to "P"-polarization). "Off"-pixels differ in their polarization from "On"-pixels. In the case of transmissive LCD TFT displays "Off"-pixel light is absorbed (eliminated) by an analyzer. In the case of reflective LC-displays "On" and "Off"-pixel light is separated by a beam splitter downstream of the modulator which reflects light of one state of polarization while transmitting the other.

Two channel stereo projection systems with liquid crystal SLMs according to the state of the art use reflective LCoS SLM (liquid crystal on Silicon). LCoS systems modulate "On" and "Off" state only by modulating their plane of polarization, while the angle of incidence is the angle of reflectance (it is, usually, 0° which is normal to the SLM surface). As a consequence, both polarization states exist in either channel and have to be separated with some effort. For the discrimination of "On" and "Off"-beams additional beam splitters are necessary (U.S. Pat. No. 5,921,650, WO Pat. No. 03/065737). Otherwise channel separation and image contrast are insufficient (U.S. Pat. No. 6,547,396). Using classical MacNeille PBS a contamination of the "S"-channel with 5% "P"-light results in a contrast <=20:1 and a channel separation of less than 1:20. While image contrast in mono systems is generally used as a quality measure channel, separation in two channel systems has hardly been discussed, whereas in acoustic stereo systems this is an acknowledged specification.

MEMSs are SLMs modulating incident light by reflecting "On"-light in a different direction than "Off"-light. DMDs from Texas Instruments (e.g. U.S. Pat No. 5,600,383) achieve this by electronically controlled micro-mirrors which can be deflected in two stable positions, thereby reflecting incident light in two different directions (a "On" and a "Off"-direction).

As MEMSs do not depend on prepolarized light, and work independent of (plane or ratio of) polarization, (mono) MEMS display systems according to the state of the art work with unpolarized light. FIG. 1 shows schematically the operational principle of MEMS. Micro-mirrors (17) can be deflected in two positions (e.g. ±12° off the normal towards the MEMS surface in recent MEMS). If the incident light reaches the mirror under an angle of twice the mirror deflection (24°), it is reflected perpendicularly (18) from the MEMS surface as "On"-light (19) ("On"-position of the mirror). If the mirror is deflected to the alternate, the "Off"-position, the incident beam is reflected with an angle of 48° to the surface normal of the MEMS as "Off"-beam.

Stereo display systems with MEMSs have been described in the state of the art which are based on single channel operation (WO Pat. No. 02/32149A2, WO 02/076107A1). These projector devices generate in an alternating fashion (sequentially) left and right images or left and right image portions with a different polarization. If in these projector systems color is generated sequentially, e.g. using a color wheel (1-Chip DLP systems) each of three primary color components exists in two states of polarization (e.g. left- and right-handed circularly polarized light). 3 Chip DLP systems, which generate color simultaneously (parallel) still alternate right and left image display. In active systems this is achieved by synchronously switching of the light flow to one of the eyes (this is usually handled by an electronic shutter system in the goggles of an observer). In passive systems the polarization is switched by a polarization conversion system (located within or outside the body of the projection system) synchronously to the display of left or right image. Passive stereo goggles with corresponding analyzers alternatively feed right and left eye (e.g. Barco Galaxy Warp, Ref No R599655; www.vr.barco.com; Barco, Kortrijk, Belgium). A disadvantage of alternating polarization stereo displays is a halving of the maximum light flux to each eye and a halving of the maximum image display frequency.

Simultaneous stereo display systems with MEMS according to the state of the art are realized with two separate mono display systems which emit two light beams with different polarization, and which do not superimpose left and right image before the screen. While this approach evades the dynamical disadvantages of single chip MEMS stereo displays, it results in substantial ergonomical disadvantages (adjustment, inaccuracy of zoom and focus, differences in light flux) and in general leads to increased setup efforts. Dependent on the system used it can also lead to a halving of the light output.

As MEMS do not change the polarization state of light, our invention is based on polarization independent image generation with MEMS for 2 channel stereo displays. The present invention is characterized by simultaneous generation of both images for left and right eye and their superposition in a single display system. The presented 2 channel MEMS system feeds the corresponding image information simultaneously to both eyes (thus at least doubling the light flux to each eye) with a high image contrast (MEMS specific) and good channel separation. Our goal is to provide a system with a comprehensive dual channel architecture analogous to the high end stereo audio amplifier in one body. The present invention renders possible the 2 channel projection of images, which are free of flicker and color artefacts at a high image frequency. The invention ensures optimally adjusted superposition within the device and thus a view of high quality 3D images for right and left eye, which comes close to natural vision. This allows the observer to have a relaxed stereo view (in contrast to prior art solutions, where disturbances in image or projection quality may cause discomfort or even nausea); in addition a common beam and a single projection lens guarantee fast installation and ease of use.

BRIEF SUMMARY OF THE INVENTION

A polarization coded 2 channel stereo display system requires two spatially separated and different linearly polarized light beams which are simultaneously modulated by at least two SLMs upstream to the superposition system (polarization combiner). When two planes of polarization are combined, one light beam ("S" polarized light) is folded into the other ("P" polarized light), the direction of which remains unchanged. This is common to all polarization combiners (PBS, e.g. MacNeille beam splitters; wire grid polarizers WGP, Moxtek Inc, UT, USA). The folding corresponds to an image reflection. As the modulation task of the SLMs takes place upstream of the superposition and only one beam is reflected (mirrored), one of the two SLMs has to create the reflected image. This can easily be achieved for liquid crystal SLMs by mirror symmetrically addressing the modulators of the two channels. Light is incident on these LC modulators with an incidence angle of 0° (perpendicular to the surface of the modulator). Light paths therefore are not influenced by rotation or mirroring of these modulators.

Obviously MEMS can also be addressed mirror symmetrically. However MEMSs of the state of the art (e.g. DMDs by Texas Instruments) do not show any axes of symmetry considering their overall operation. Only the "On" beam is reflected perpendicular to the modulator surface. The incident beam however is perpendicular to the mirror deflection axis (the deflection axis is normal to the plane of incidence), which is rotated by 45° to the image raster. On the other hand, the incidence angle is twice the deflection angle of a single mirror (e.g. 24°). Thus, with a single DMD type as described no symmetrical light paths are possible.

A DMD with a 3×4 matrix is shown in FIG. 2a (this corresponds to the predominant width/height ratio of 4/3). Single mirrors (17) rotate around a deflection axis which has an angle of 45° relative to the raster image. In FIG. 2b. the single mirror deflection axes are visible after "removing" the mirrors. The center DMD corresponds to the state of the art type from Texas Instruments (U.S. Pat. No. 5,600,383). While the raster image shows internal symmetry, this is no longer the case if the orientation of the mirror deflection axis is taken into account. For overall operation no internal symmetry exists. After any mirroring (only horizontal and vertical mirroring is shown) this central "L" topology is converted into a single "R" topology. Due to their rectangular shape and to the orientation of the mirror deflection axes, which are rotated 45° to the image raster, these MEMS show stereo isometry. Stereo isometry is characterized by the existence of two different topologies which are mirror symmetric and cannot be transformed into each other by rotation.

FIG. 3 shows basic features of our first embodiment. Mirror symmetric, efficient light paths and a complete superposition of the two images with a polarization combining system (6) require both stereo isometric MEMS topologies. MEMS (2) is of the available DMD topology ("L" type of FIG. 2). MEMS (1) is of the stereo isometric MEMS topology ("R" type). Light paths in both channels are directed such, that the planes of incidence ($T1_{POI}$, $T2_{POI}$) formed by the incident and reflected beams of the TIRs are parallel to the plane of incidence (26, $P2_{POI}$ formed by the incident and reflected beams of the PBS (6). The superposed image (22) shows that the virtually projected mirror deflection axes (21) of the two MEMSs (1 and 2) are parallel and that a complete overlap of the two corresponding images is possible. FIGS. 4-7 show embodiments of our invention using such minimal and efficient light paths which are mirror symmetric relative to the polarization effective layers of the beam splitters (5) and (6) and which preferably use both stereo isomers. FIGS. 8-12 show embodiments of our invention which use only one topological type of MEMS (e.g. the recently produced DMD type by Texas Instruments). This is achieved by modifications of superposition (FIG. 8), DMD topology (FIG. 9) and light path (FIG. 10-12).

BRIEF DESCRIPTION OF THE SEVERAL VIEWS OF THE DRAWING

FIG. 4 shows a first embodiment of the invention, a winglike arrangement of beam splitters and TIRs with mirror symmetric light paths and stereo isometric MEMSs (stereo wings).

FIG. 5 shows a second embodiment of the invention, an arrangement of beam splitters and TIRs with symmetric light paths, folded channels and stereo isometric MEMSs (folded stereo wings).

DETAILED DESCRIPTION OF THE INVENTION

Figure 1:
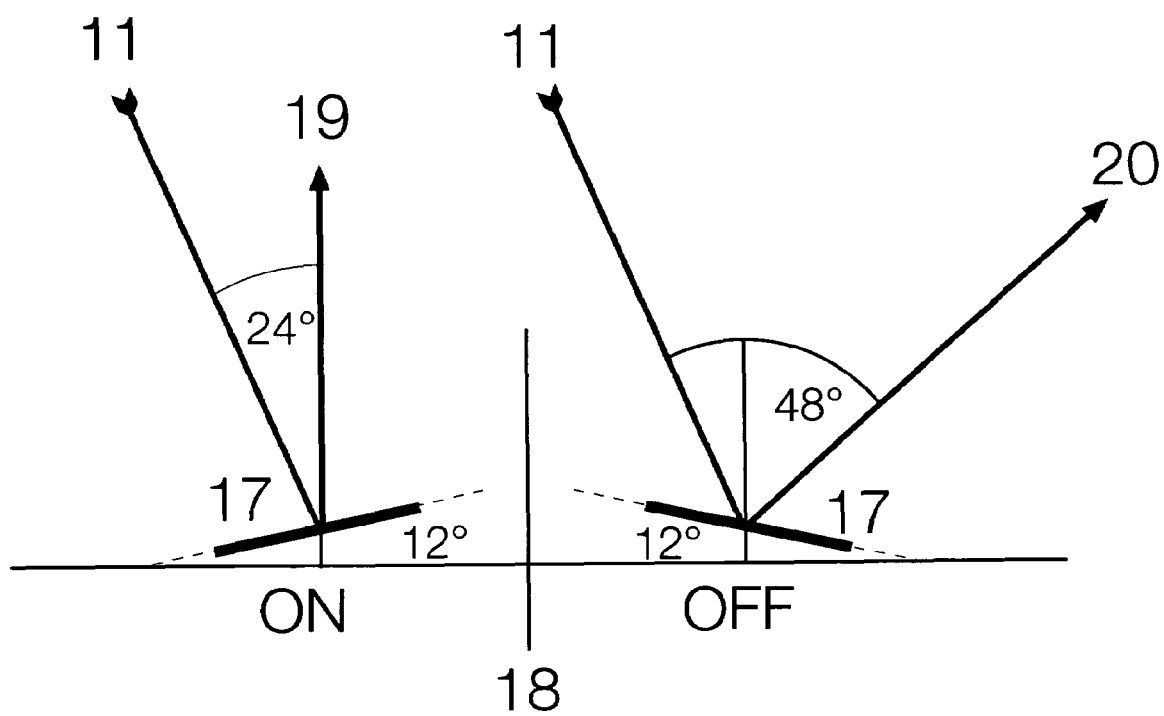
FIG. 1 is a schematic diagram illustrating the operation of a MEMS (DMD).
Figure 2A:
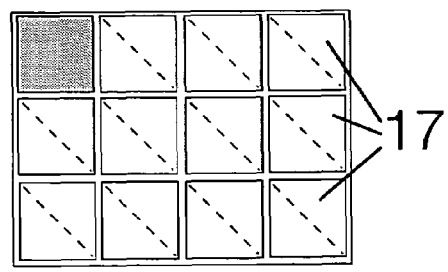
FIG. 2 shows the stereo isometric topology of MEMS according to the state of the art.
Figure 2B:
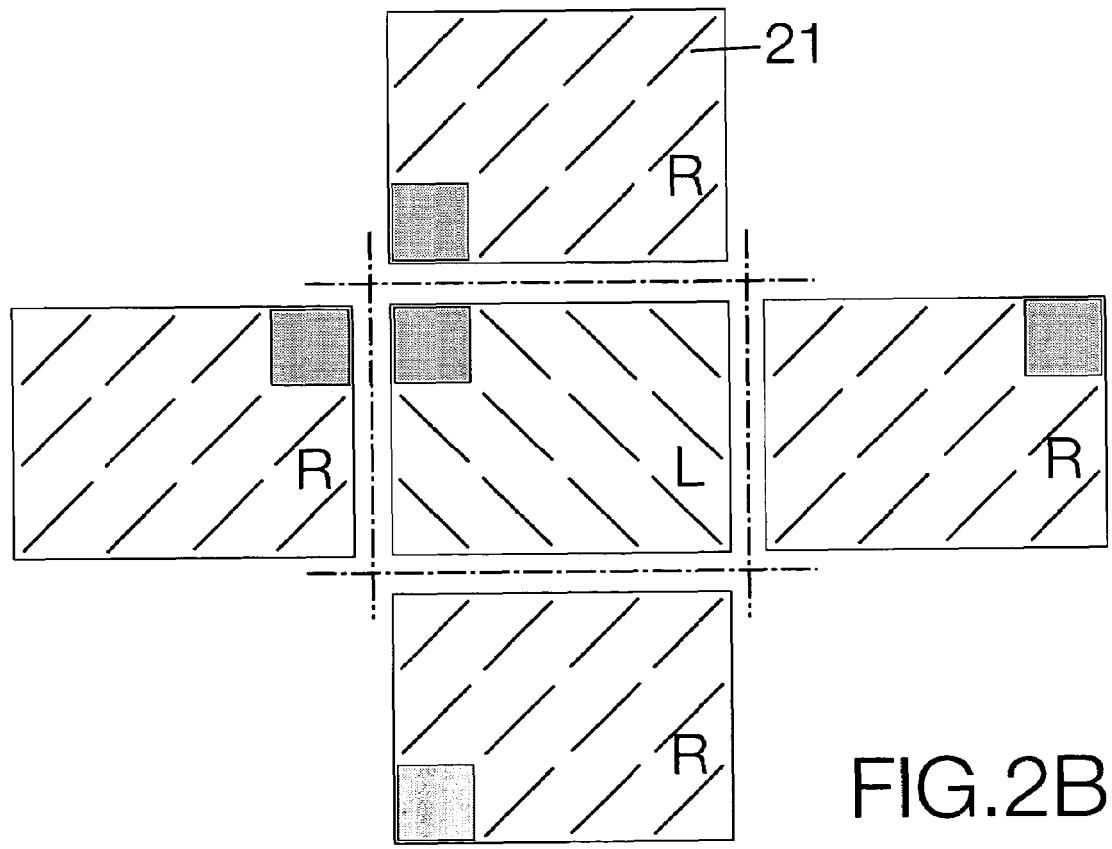
Figure 3:
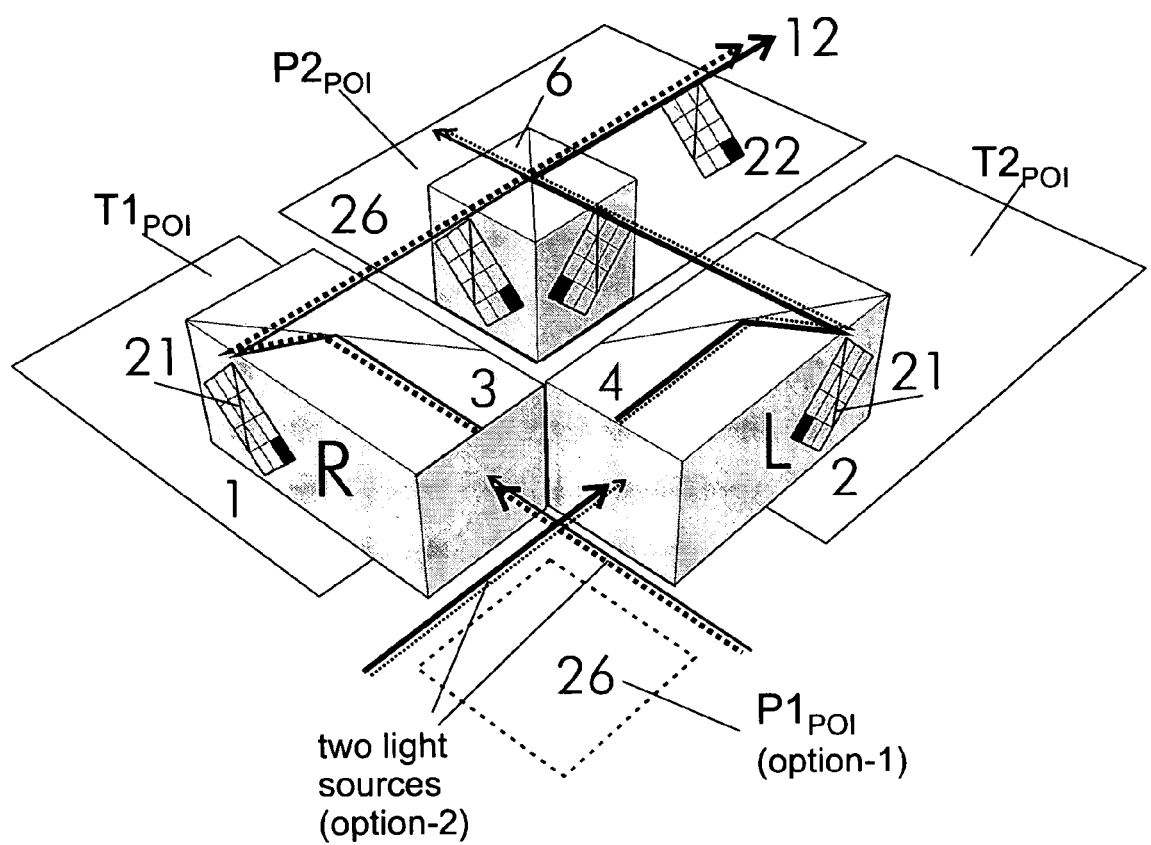
FIG. 3 shows the basic features of the first embodiment shown in FIG. 4.
Figure 6A:
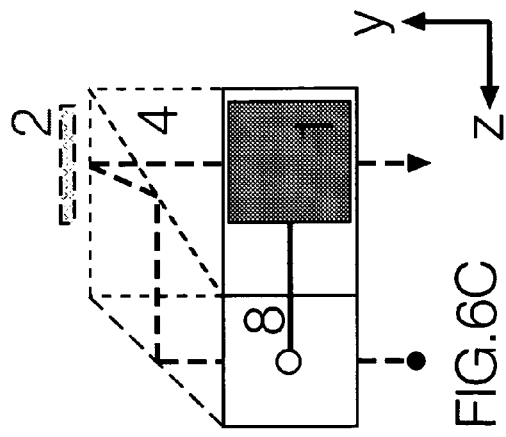
FIG. 6 shows a third embodiment of the invention, an arrangement of beam splitters and TIRs with symmetric light paths, folded channels, stereo isometric MEMSs and stacked beam splitter and combiner (stacked stereo wings).
Figure 6C:
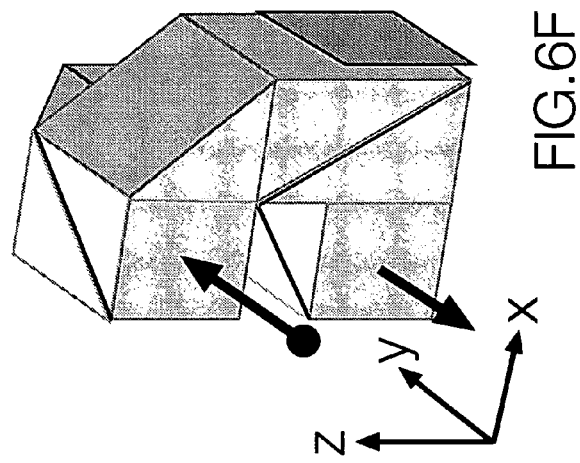
Figure 6B:
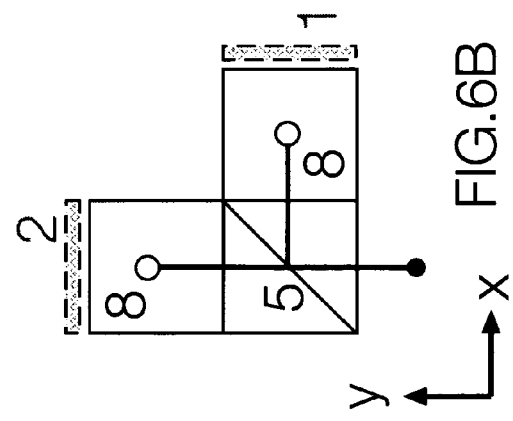
Figure 6E:
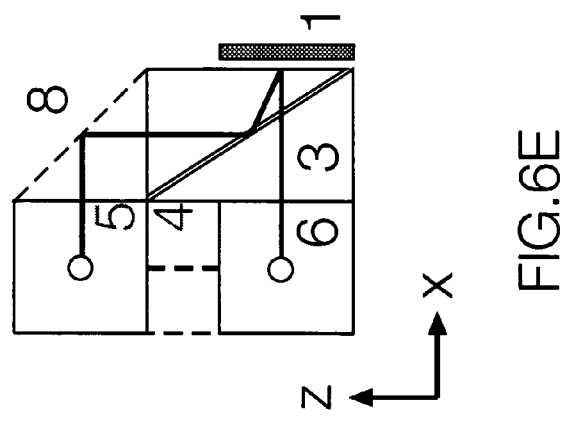
Figure 6D:
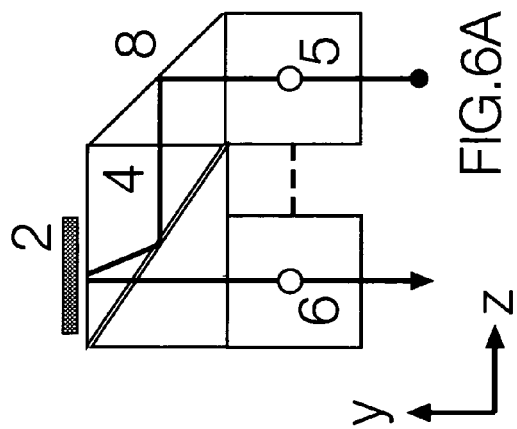
Figure 6F:
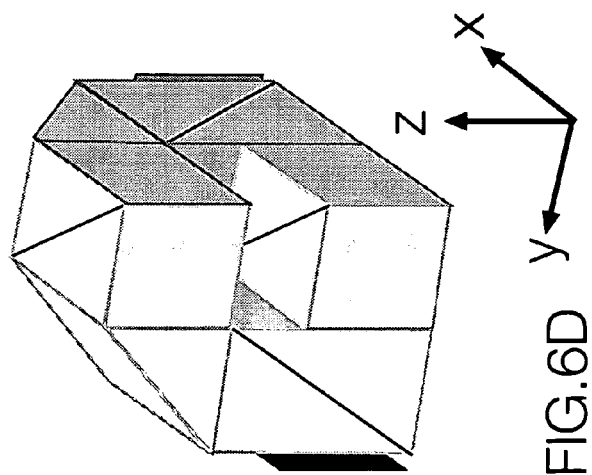

For the sake of simplicity all following figures are labeled in a way that identical numbers in different figures indicate identical components. MEMS 1 (1); MEMS 2 (2); TIR 1 (3); TIR 2 (4); PBS 1 (5); PBS 2 (6); WGP (7); deflection mirror or TIR (8); cleanup polarizer for "S"-light (9); cleanup polarizer for "P"-light (10); incident beam (11); superimposed "On" beam (12); channel 1 (13); channel 2 (14); dump: "Off-light" channel 1 (15); dump: "off-light" channel 2 (16); single deflectable mirror (17); normal (18); "On"-beam (19); "Off"-beam (20); mirror deflection axis (21); superimposed image (22); trichroic prism assembly (TPA) for color separation/color recombination in channel 1 (23); TPA in channel 2 (24); polarization conversion system PCS (25); plane of incidence of the polarizing beam splitter ($P_{POI}$, 26). In FIGS. 5, 6, 10 and 11 a small circle marks positions, where a light beam is deflected in a direction perpendicular to the drawing plane.

Figure 8:
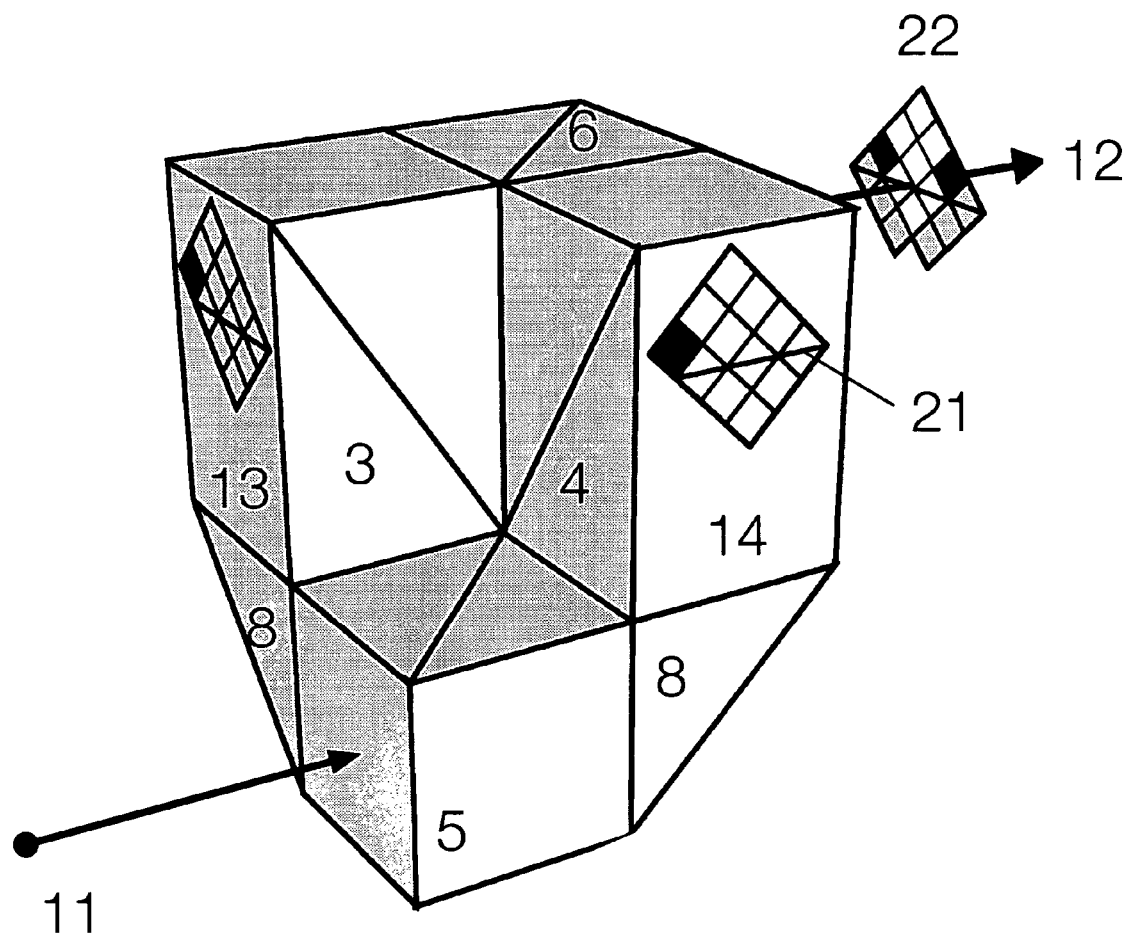
FIG. 8 shows a fifth embodiment of the invention, an arrangement of beam splitters and TIRs with symmetric light paths, two MEMS modulators of the same topology, and a quadratic overlap region of the two modulators (folded stereo wings with partial image overlap).
Figure 9:
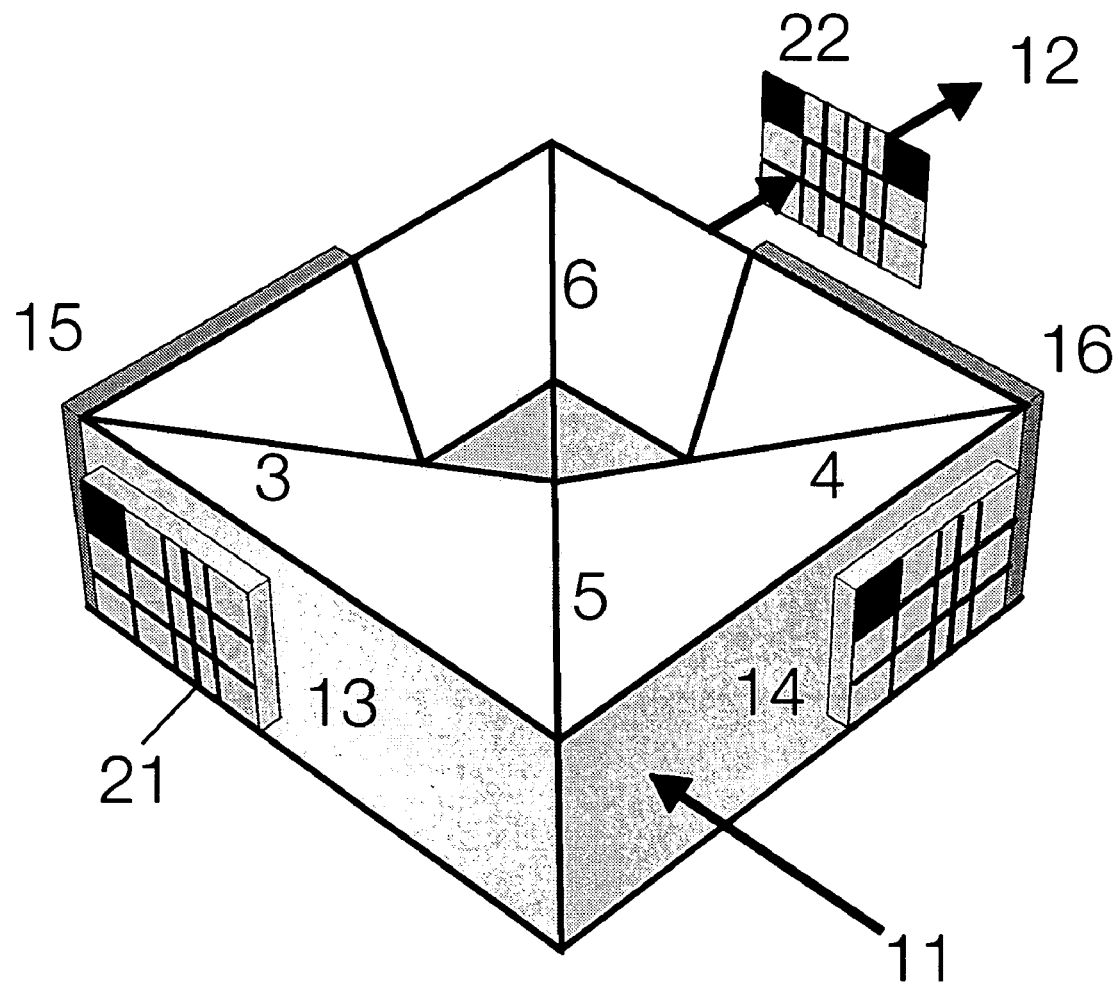
FIG. 9 shows a sixth embodiment of the invention, an arrangement of beam splitters and TIRs with symmetric light paths, and two MEMS modulators of the same topology that show internal symmetry (stereo wings with internally symmetric MEMSs).
Figure 10C:
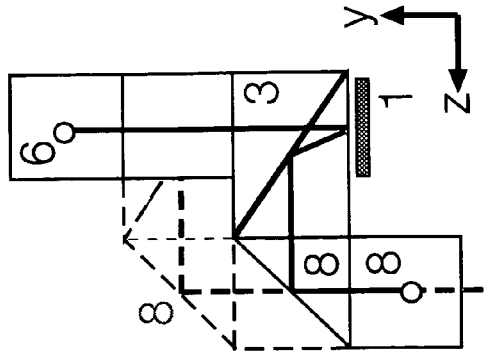
FIG. 10 shows a seventh embodiment of the invention, an arrangement of beam splitters and TIRs with asymmetric light paths, two MEMSs of only one topology, and an additional mirror (stereo wings with additional mirroring).
Figure 10F:
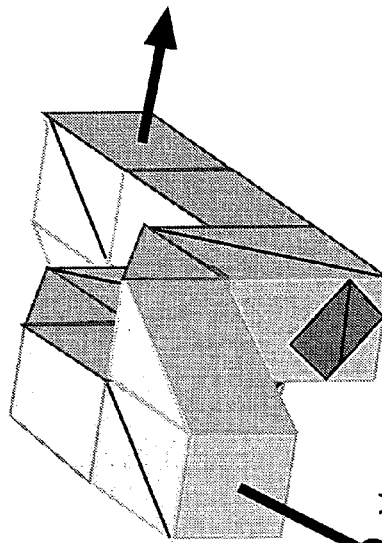
Figure 10B:
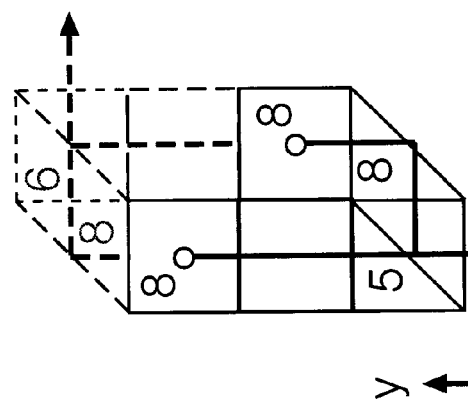
Figure 10E:
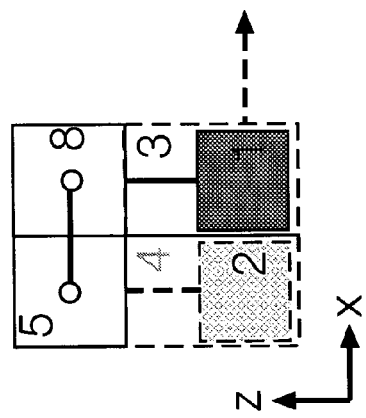
Figure 10A:
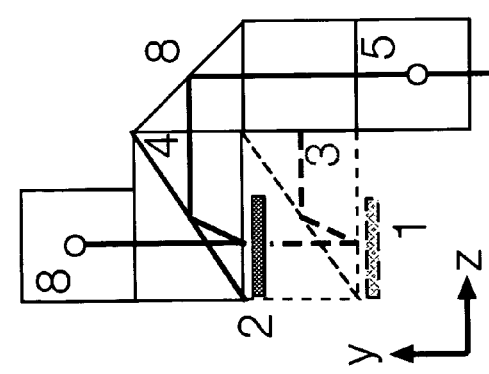
Figure 10D:
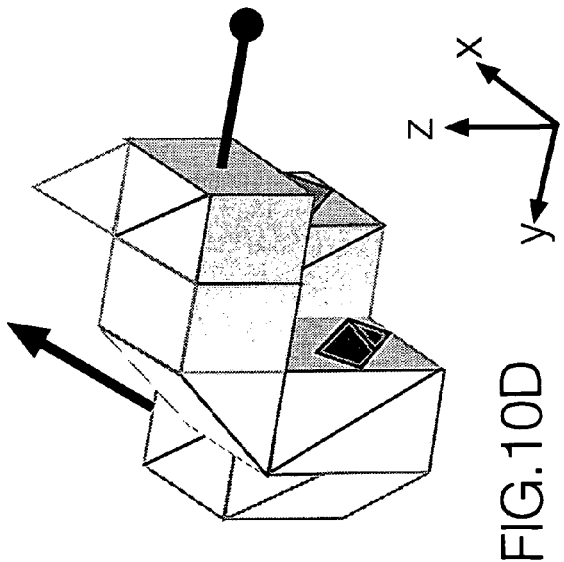
Figure 11A:
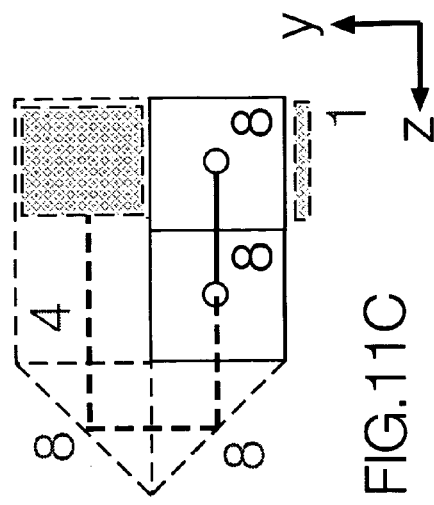
FIG. 11 shows an eighth embodiment of the invention, an arrangement of beam splitters and TIRs with asymmetric light paths and two MEMS of only one topology, where the TIR prisms are arranged such that their planes of incidence are perpendicular to each other (stereo wings with perpendicularly TIRs).
Figure 11B:
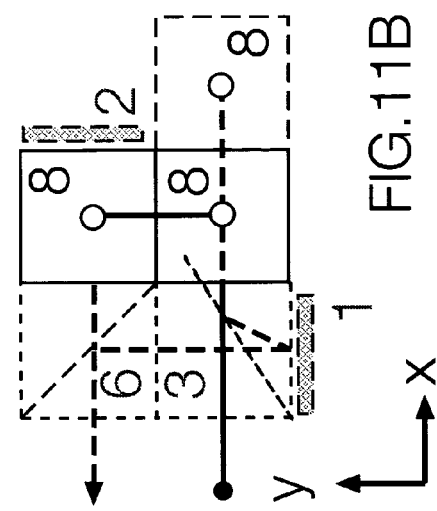
Figure 11C:
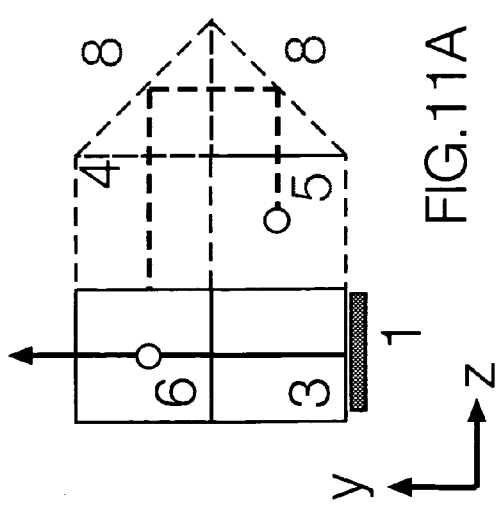
Figure 11D:
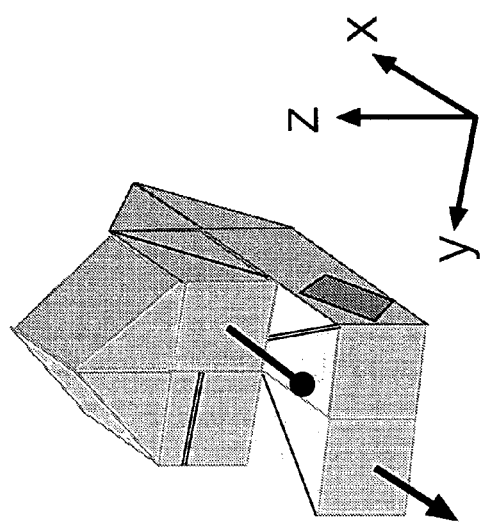
Figure 11E:
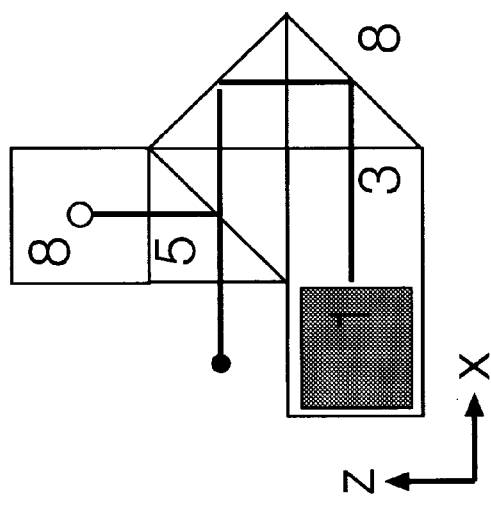
Figure 11F:
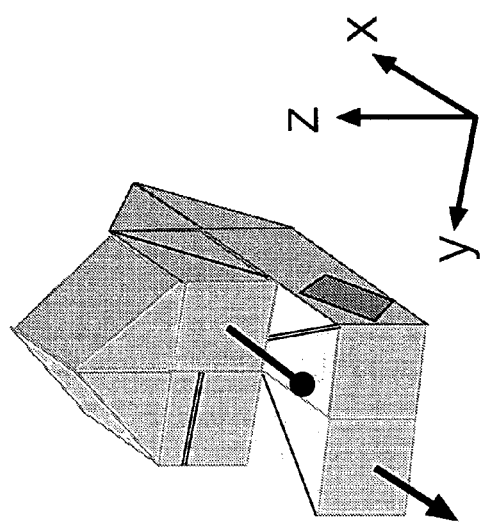

FIG. 4 shows the first embodiment of the invention (stereo wings). Light beams emitted by a light source are directed to a first beam splitter (5) which splits the incident light (11) into two spatially separated and linearly polarized beams ("S" and "P" polarization states are indicated by stippled and dashed lines), resulting in two simultaneously modulated channels. It is appreciated that while the drawing shows a perpendicular angle between the channels resulting from the use of a MacNeille type PBS, other angles between the channels are possible if other types of beam splitters and incidence angles are used for beam splitting and/or beam combining (e.g. wire grid polarizers WGP). Both polarized beams are then directed onto two spatial light modulators (1 and 2, SLMs, e.g. DMDs) in two functionally identical modules, which are arranged mirror symmetrically, and which comprise a total internal reflection prism (TIR) each (3) resp. (4). The said SLMs, shown are DMDs, modulate the incident beam (11) by a different mirror deflection in the "On" versus the "Off" state of a pixel. "On" pixel light is reflected in the normal of the DMD surface. Modulated "On" beams are recombined in a second beam splitter element (6). In both channels, light paths are arranged such that the plane of incidence ($T1_{POI}$, resp. $T2_{POI}$), which is spanned by incident and reflected beam of the TIR, is parallel to the plane of incidence ($P2_{POI}$), which is spanned by the two incident beams of the PBS (6). A polarization "impurity" (e.g. 5% "P" polarization in the "S" beam), which results in a regular beam splitter, will be greatly removed in the second beam splitter element by the impurities leaving the system in a different direction than the superimposed beam. Thus, a spatial or functional separation of polarization splitter and polarization beam combiner will lead to substantially improved channel separation of the two stereo channels—this reduces "ghosting" (e.g. "P" light in the "S" beam) by a factor of 20 (in the case of MacNeille type PBS), overall channel separation will increase to 400:1. It is appreciated that channel separation, in accordance with our invention, can further be improved by additional cleanup polarizers. FIG. 4A shows a wing-like symmetrical arrangement of the two channels, which is described by our term "stereo wings". As is shown in FIG. 4A, the embodiment can be used with additional dumps to absorb the "Off" beams, or, as is shown in FIG. 4B, without dump in the modules. While FIG. 4 shows preferred arrangements which employ stereo isometric MEMSs (both isoforms are used), it is appreciated that in accordance with our invention only a single topology can be used, as is shown in FIGS. 8 and 9. In FIG. 4B downstream of the superposition splitter, a polarization conversion system (25) is attached to the stereo wings (e.g. an achromatic quarter wave plate). In combination with adapted passive stereo goggles for circularly polarized light, the observer may rotate his/her head around the roll axis without influence on channel separation.

FIG. 5 shows the second embodiment of the invention, which is derived by the folding of the wings in FIG. 4 (folded stereo wings). Both TIRs are rotated by 90°, the folding is accomplished by two deflection mirrors (8), which connect the output of the polarization splitter (5) to the rotated TIRs. The light path in the two channels is directed such that $T_{POI}$ is now perpendicular to $P_{POI}$. The arrangement shown in FIG. 5 may be advantageous when a back focal length (optical length between modulators and projection lens) of minimum size is required. FIG. 5 shows this embodiment of the invention in a top view (FIG. 5B), three side views (FIG. 5A, C, D) and an isometric scheme (FIG. 5E). Beams in the uppermost layers of the views are shown in solid lines, while a dashed line indicates beams in lower planes. Optical axes perpendicular to the drawing plane (paper plane) are indicated by a small circle. In FIG. 5E, the input splitter PBS (5) in the top of the arrangement, the combiner PBS (6) at the bottom of the arrangement, and both TIRs (3 and 4), are indicated as well as the two 90° deflectance mirrors (8). FIG. 5B shows a top view (xy-plane) in which the incident light (black filled circle) is obvious. This incident light beam is then split by the input PBS (5) into two differently polarized light beams, which are deflected by the mirrors (8) to the bottom layer. FIG. 5E also shows the superposition PBS (6) in the bottom layer, and superimposed beam (arrow head) leaving the module in the same direction as the input beam enters it. In a side view FIG. 5C shows the light path of channel 1 from the polarizing beam splitter (5) via the 90° mirror (8) in direction of MEMS (1). In another side view FIG. 5D shows the further light path through TIR (3) to MEMS (1) and the "On" beam from the modulator to the superposition PBS (6). FIG. 5A shows, in a corresponding side view, the light path of the second channel.

FIG. 6 shows a third embodiment of the invention (stacked stereo wings). This drawing is to be read analogous to FIG. 5. In contrast to the second embodiment, the PBSs for splitting (5) and recombining (6) the light are arranged in a stacked position. It is appreciated that both systems could also be realized by a single larger PBS. Input and output beam are also arranged on top of each other. FIG. 6D and FIG. 6F are isometric 3D drawings from different points of view. FIG. 6B is a top view, and FIGS. 6A, C, E are side views.

Figure 7:
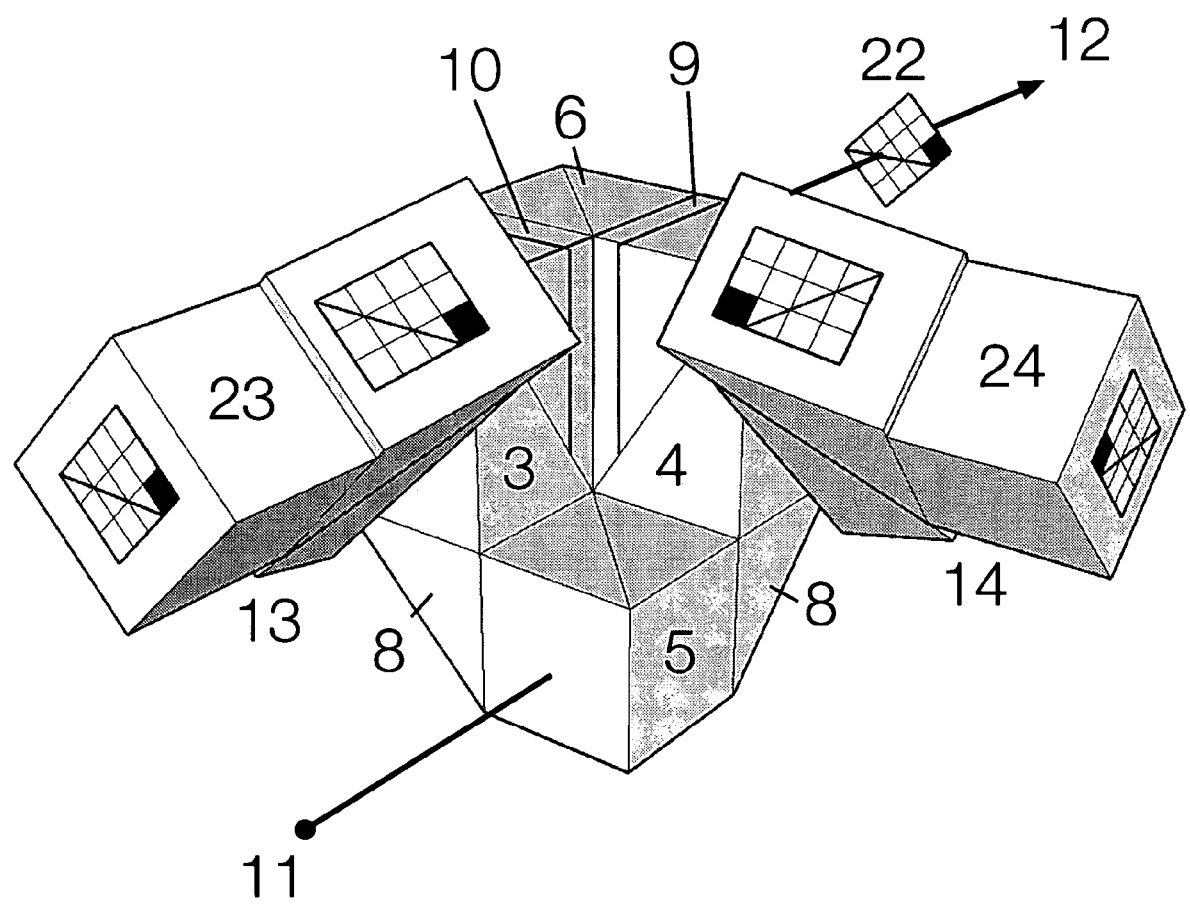
FIG. 7 shows a fourth embodiment of the invention, an arrangement of beam splitters and TIRs with symmetric light paths, stereo isometric MEMSs and TPAs with three MEMSs for simultaneous color generation per channel (folded stereo wings with simultaneous color generation).

FIG. 7 is a fourth embodiment of the invention (folded stereo wings with simultaneous color generation). As in the first three embodiments, preferentially both stereo isometric forms of the MEMSs are used. It is a slightly enhanced setup compared to FIG. 5, where instead of the single MEMSs (1) and (2) a color separation/color recombination system (23, 24) is connected to the TIRs (3) and (4). These systems in the drawing comprise TPAs with 3 MEMS each for each primary color in both channels (13) and (14). It is well appreciated that other systems for simultaneous color generation could replace the TPAs within the scope of our invention. The drawing also indicates two optional polarization correction systems (9) and (10) for the "S" and the "P"-channels. Please note that the 45° rotated position of the TPA in one channel, which is state of the art (e.g.Texas Instruments Technical Journal, 1998: Larry J. Hornbeck: From cathode rays to digital micro mirrors: A history of electronic projection display technology) in one channel is accompanied by a inversely rotation of the second, stereo isometric MEMSs bearing TPA.

In the preceding four embodiments both stereo isometric forms of MEMSs (e.g. L-type in one channel and R-type in the second channel) were used which rendered possible effective and symmetrical light paths of the two channels. It is appreciated, that many embodiments with symmetrical light paths and the employment of both stereo isometric topologies of MEMS can be derived by persons known to the art within the scope of our invention.

FIGS. 8-12, in contrast to the preceding drawings, show embodiments that were developed to employ only one single topology of a MEMS.

FIG. 8 shows a sixth embodiment of the invention (folded stereo wings with partial image overlap). Despite the symmetric light path in the folded wings arrangement (compare FIG. 5) only a single topology is used for the MEMSs in both channels. In the arrangement shown in FIG. 8 this leads to a partial overlap of both modulated beams. FIG. 8 shows a version of this embodiment where at a certain alignment of the MEMSs only a quadratic superposition region is addressed by either channel.

FIG. 9 shows a seventh embodiment of the invention (stereo wings with MEMS which show internal symmetry). As in FIG. 8, the embodiment shows again symmetric light paths of the two channels and yet only one MEMS topology. This special MEMS however is internally symmetric. This can be achieved e.g. by DMDs as described in U.S. Pat. No. 5,600,383 to Texas Instruments, which rotate their deflection mirrors around a deflection axis that is horizontally or vertically aligned with respect to the image raster. This display topology can be rotated by 180° to yield the mirror symmetric form, and is therefore not a stereo isomer. While the figure shows MEMSs with vertical mirror deflection axes, a MEMS with a horizontal axis or a quadratic MEMS with a diagonal axis is well within the scope of this embodiment.

In contrast to the previous embodiments with symmetric light paths, the following embodiments of our invention are realized with MEMSs of a single topology (e.g. the DMD of Texas Instruments); these embodiments use asymmetric light paths in the two channels.

FIG. 10 shows a schematic view of the seventh embodiment of our invention (stereo wings with additional folding). It uses two MEMSs of one topology ("L"-type). Complete image superposition is obtained by mirroring one of the two subimages before the superposition, thus creating a virtual stereo isomer of one MEMS. The figure is to be read like FIGS. 5 and 6. FIG. 10D and FIG. 10F show isometric views of the embodiment. FIG. 10B shows in a top view the additional mirror (8) in channel 2 upstream the superposition PBS (6). The back focal length of channel 1 increases accordingly. FIG. 10A, C, E show different side views.

FIG. 11 shows a schematic view of the eighth invention (stereo wings with perpendicularly arranged TIRs). Like the embodiment shown in FIG. 10, it uses two MEMSs of only one typology ("L"-type). The figure is to be read like FIGS. 5, 6 and 10. FIG. 11D shows the core of this embodiment with two TIRs and the superposition PBS: the two TIR prisms are arranged in a way that their planes of incidence ($T1_{POI}$, $T2_{POI}$) are perpendicular (their cutting angle is 90°). With this use of asymmetric light feed a complete overlap of the two subimages generated by the two SLMs is obtained although they consist of the same topology. (Note that in a virtual superposition image of the mirror deflection axes of MEMS (1) and (2), indicated in FIG. 11D, one would see them perpendicularly arranged, in contrast to all preceding embodiments, where one would see them parallel arranged). Light paths of the two channels are arranged in a way that the $T1_{POI}$ (and the POI of MEMS 1) is parallel to the $P2_{POI}$ of the superposition PBS (6) whereas the $T2_{POI}$ (and the POI of MEMS 2) is perpendicular to $P2_{POI}$. FIG. 11F shows an isometric view of the total arrangement. In contrast to all preceding embodiments polarizing splitter (5) and polarizing combiner (6) are rotated by 90° relative to each other (the polarizing layer of PBS 5 is parallel to the y-axis, while the polarizing layer of PBS 6 is parallel to the z-axis). The light beam folded by PBS (5) ("S") transmits PBS (6) (acts as "P"-light on this superposition PBS) and vice versa. FIG. 11B shows a top view and FIGS. 11A, C, E show corresponding side views from different points of view indicated by the coordinate axes of their view planes.

Figure 12A:
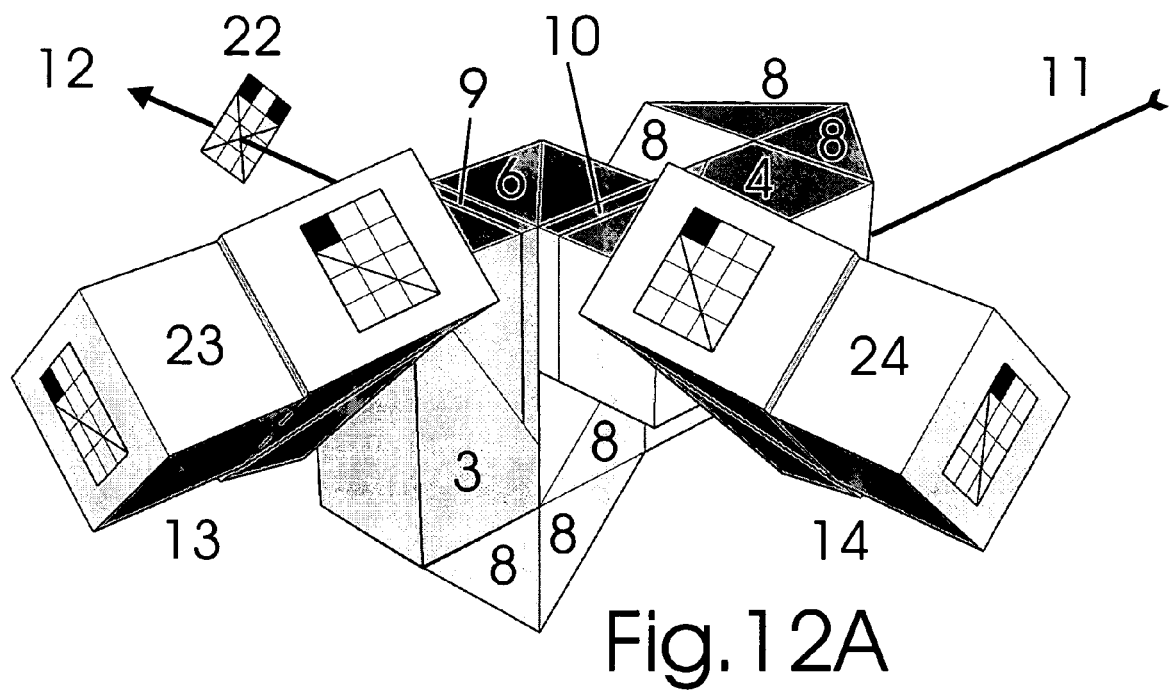
FIG. 12 shows a ninth embodiment of the invention, an arrangement of beam splitters and TIRs with asymmetric light paths and six MEMS of only one topology (stereo wings with perpendicularly TIRs and simultaneous color generation).
Figure 12B:
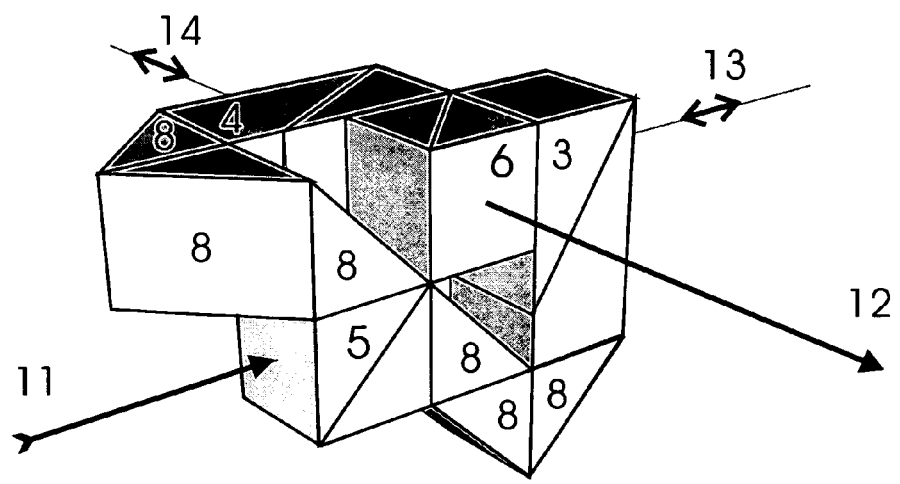

FIG. 12 shows a schematic view of the ninth embodiment of our invention (folded stereo wings with perpendicularly arranged TIRs and simultaneous color generation). This embodiment is a slightly enhanced version of the embodiment shown in FIG. 11. Instead of only one MEMS per channel a TPA with three MEMSs per channel is used. The difference compared to FIG. 7 (symmetric light path with both MEMS topologies) is the use of only one MEMS topology ("L" type). The incident beam (11) is split by the PBS (5) into two subbeams and directed via three mirrors (8) in each of the two channels (13, 14) to the perpendicularly arranged TIRs (3, 4). From there the beams are directed to the TPAs (23, 24) for color separation. The modulated "On"-beams are then color combined in the same TPA and superposed by PBS (6). Like in FIG. 11, in a virtual superposition image of the mirror deflection axes of MEMS (1) and (2), one would see them perpendicularly arranged. Optional means for correcting skew rays or other polarization impurities (9, 10) are inserted upstream of superposition in both channels (e.g. "polar correct" from Colorlink Inc, CO., USA).

A minimum projective display system in accordance to our invention may comprise at least one light source, means for sequential color generation, integrating means for homogenizing light, one of our 2 channel image display systems with two MEMSs and a projection lens. Sequential color generation may be realized by a color wheel (e.g. Sequential Color Recapture SCR or color wheel, e.g. from Optical Coating Laboratory Inc, OCLI, CA, USA or a "High efficiency field sequential color wheel" after U.S. Pat. No. 5,921,650). In contrast to these mechanically color switching methods, sequential color generation could also be realized by electronically switching color systems (e.g. ColorSwitch from ColorLink, CO, USA) or similar systems.

Our embodiments are, however, also suitable for highest quality systems with simultaneous color generation (e.g., more than one MEMS in each channel) as shown in an exemplary illustration in FIGS. 7 and 12.

It will be appreciated that whilst this invention is described by way of detailed embodiments, these realizations serve as illustrations of the invention but not as a limitation of the invention; numerous variations in form and detail can be deduced by those skilled in the art or science to which the invention pertains without leaving the scope of the invention as defined by the following claims.

The invention claimed is:

1. A 2-channel display system comprising
   two spatially separate channels, simultaneously feeding two polarization coded images into a common light path out of which said images may be separated by a polarization decoding system;
   unpolarized light of at least one light source, comprising at least 3 spectral components, which are sufficient to span a color space;
   a polarization split system $PBS_1$ with a plane of incidence $P1_{POI}$ or polarization conversion systems simultaneously generating two spatially separated light beams of a different linear polarization feeding the two channels;
   SLMs (spatial light modulators) of the MEMS type (Micro Electro Mechanical System), at least one in each channel, characterized by modulating light via the direction of the reflection of the incident light beam;
   MEMSs positioned such that the axis of the incident light beam differs from the axis of the modulated "ON"-light beam, the modulated "ON" beam being reflected normal to the MEMS surface;
   said MEMS having a stereo-isomeric topology with regard to mirror deflection axes and image raster, and both stereo-isomeric topologies being used;
   a polarization combining system $PBS_2$ with a plane of incidence $P2_{POI}$ for superimposing the two spatially modulated "ON " light beams of each channel into a common "ON " light beam, the polarization combining system being spatially separated from the polarization split system;
   means to control the mirror arrays of the MEMS in both channels independently from each other;
   MEMSs rotated so that the mirror deflection axes of the MEMSs of the two channels are parallel in their virtual projection in the superposition image.

2. A 2-channel display system according to claim 1 with additional means for folding the light paths in both channels, at least 1 in each channel, additional to the reflection of the MEMSs, and additional to the folding in said PBSs;
   said means for folding being TIRs.

3. A 2-channel display system according to claim 1 using a polarization conversion system transforming the linearly polarized light into circularly polarized light, one channel comprising left-handed, the other right-handed circular polarization.

4. A 2-channel display system according to claim 1 using polarization correction systems upstream to the superposition.

5. A 2-channel display system according to claim 1 using stereoscopic information to control the MEMSs of the two channels.

6. A 2-channel display system according to claim 1 comprising
   a body;
   means to generate colors sequentially;
   one MEMS display in each channel;
   a projection lens.

7. A 2-channel display system according to claim 1 comprising
   a body;
   means to generate colors simultaneously;
   more than one MEMS display in each channel;
   a projection lens.

8. A 2-channel display system according to claim 1, with additional means for folding the light paths in both channels, at least 1 in each channel, additional to the reflection of the MEMSs, and additional to the folding in said PBSs;
   said means for folding being TIRs with planes of incidence $T1_{POI}$ and $T2_{POI}$;
   said $P1_{POI}$, $P2_{POI}$, $T1_{POI}$, and $T2_{POI}$ being all in one plane.

9. A 2-channel display system according to claim 1, with additional means for folding the light paths in both channels, at least 1 in each channel, additional to the reflection of the MEMSs, and additional to the folding in said PBSs;
   said means for folding being TIRs with planes of incidence $T1_{POI}$ and $T2_{POI}$; said planes $P1_{POI}$, $P2_{POI}$ being parallel, $T1_{POI}$, $T2_{POI}$ being perpendicular, and the $P_{POI}$s being perpendicular to either $T_{POI}$.

10. A 2-channel display system according to claim 1 with additional means for folding the light paths in both channels, at least 1 in each channel, additional to the reflection of the MEMSs, and additional to the folding in said PBSs.

11. A 2-channel display system according to claim 1, with additional means for folding the light paths in both channels, at least 1 in each channel, additional to the reflection of the MEMSs, and additional to the folding in said PBSs;
   said means for folding being TIRs;
   said $P1_{POI}$ and $P2_{POI}$ being parallel.

12. A 2-channel display system according to claim 1, all planes of incidence (POI) being orthogonal with respect to their reflection surfaces within the two channels.

13. A method of using a 2-channel display system as claimed in claim 1.

* * * * *